United States Patent Office 3,773,725
Patented Nov. 20, 1973

3,773,725
COPOLYMERIC POLYAMIDE-ACIDS, AMIDE-IMIDES AND COPOLYIMIDES CONTAINING AZO LINKAGES AND PROCESS FOR THEIR PREPARATION
Imre Puskas, Chicago, and Ellis K. Fields, River Forest, Ill., assignors to Standard Oil Company, Chicago, Ill.
No Drawing. Filed Aug. 3, 1970, Ser. No. 60,648
Int. Cl. C08g 20/32
U.S. Cl. 260—47 CP                    11 Claims

ABSTRACT OF THE DISCLOSURE

Copolymer compositions of the amide-imide variety are made by polymerizing primary diamines with azobenzene-tetracarboxylic acid dianhydride and aromatic polycarboxylic acid anhydride comonomers. The polymers are linear, shapable, highly-soluble compositions which as formed contain amide acid groups. The polymers in dry powder form are useful for compression molding and in solution form are useful for adhesive coatings, porous material impregnating, casting films, preparing fibers and insulating coatings. The polymers are heat-modifiable converting to the imide form at elevated temperatures producing compositions having excellent solvent resistance, thermal stability and electrical properties.

BACKGROUND OF THE INVENTION

Amide-imide type polymers are a relatively new class of materials known for high solubility and moderate molecular weight in the amide form which can be heat-modified to the imide form producing insoluble, inflexible, tough, adherent, heat resistant dielectric resins useful as electric insulating and impregnating material. The discovery of novel, difunctional monomers produced by linking two phthalic acid molecules with an azo group leads to a new group of useful polymers and copolymers when reacted with diamines. These monomers and the polymers therefrom are described in other copending applications.

SUMMARY OF THE INVENTION

This invention relates to a novel class of copolymers obtained by reacting azobenzenetetracarboxylic acid dianhydride and aromatic polycarboxylic acid anhydride comonomers with primary diamines. More specifically, it has been found that shapable, heat-modifiable, linear copolymers may be made which are condensation products of azobenzenetetracarboxylic acid dianhydride (hereinafter called azophthalic anhydrides) and one o more difunctional reactive-acid-derivatives (dianhydrides, monoanhydride acid halides, diacid dihalides) with aromatic primary diamines.

STATEMENT OF THE INVENTION

Copolymers of the random or block type can be made by condensing two or more comonomers from the group consisting of an azophthalic anhydride and an aromatic polycarboxylic acid anhydride with a primary diamine.

In the simplest case of using one difunctional reactive-acid-derivative, one azophthalic anhydride derivative and a diamine, the copolymer will have A units represented by:

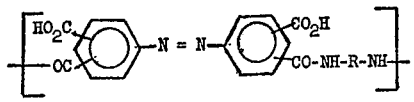

wherein the —CO₂H and —CO— groups occupy either 2,3 or 3,4 positions on each of the benzene rings, and B units represented by one of the following formulas:

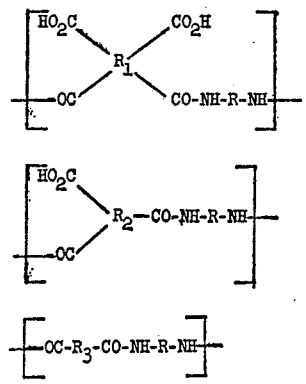

wherein $R_1$ is a tetravalent, $R_2$ is a trivalent and $R_3$ is a divalent organic radical selected from the group consisting of phenylene, naphthacenylene and anthracenylene and fluorine, chlorine, lower alkyl and lower alkyl ether substituted derivatives thereof.

In each of the above formulas R is a divalent aromatic or aliphatic organic hydrocarbon radical having at least two carbon atoms. This hydrocarbon radical consists of R' and which is a divalent aromatic radical or two R' divalent aromatic hydrocarbon radicals, joined by stable linkages such as oxy, carbonyl, sulfonyl, sulfur, methylene, ethylene, propylene, tetramethylene and their various isomers. For example, the following compounds are suitable:

$$R'-O-R', \ R'-CH_2-R', \ R'-(CH_2)_2-R', \ R-(CH_2)_3-R',$$

$$R'-(CH_2)_4-R', \ R'-\overset{O}{\underset{\|}{C}}-R' \text{ and } R'-S-R'$$

Other copolymers are within the contemplation of this description wherein the two isomeric units of A are present with no units of B and also those in which one or both isomeric units of A are combined with more than one of the units of B.

The molecular weight of these mixed polymers is sufficiently high to produce upon heating a tough, elastic film which has the polyimide-azo structure. These novel polymeric materials are usually produced in solution using a solvent such as N-methylpyrrolidone or dimethylacetamide and the solutions may be used directly for coatings, impregnations, wire enamel, films, fibers and laminates or, alternatively, the solid polymers can be precipitated from their solutions and after drying, molded into articles of the desired shape.

After being applied, the polyamide-azo units are usually converted by heat treatment to insoluble polyimide-azo units which gives the copolymers their solvent resistance, heat resistance, toughness and electrical insulating properties. The polyimide-azo copolymers are high molecular weight compounds containing reoccurring A' units of:

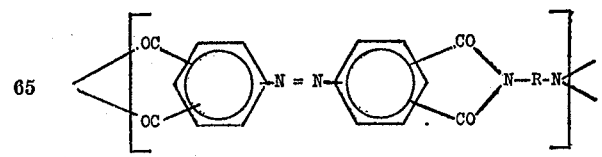

wherein the —CO— groups occupy either 2,3 or 3,4 positions on each of the rings and wherein R is as defined above. These polyimide-azo copolymers also contain reoccurring B' units represented by one of the following formulas:

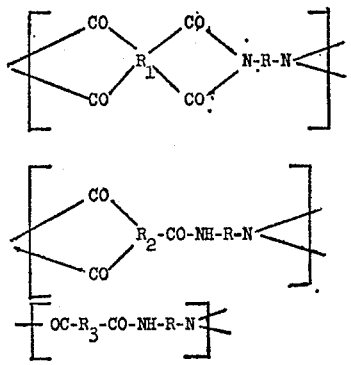

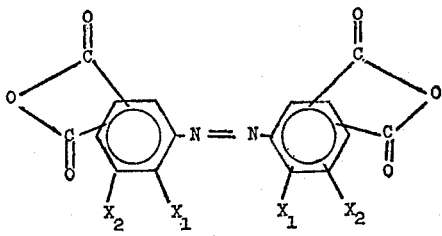

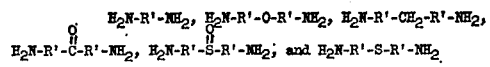

wherein $R_1$, $R_2$ and $R_3$ are defined as above.

The copolymers of this invention are advantageously prepared by reacting as a comonomer azo-containing dianhydrides with primary diamines. The azo-containing aromatic dianhydrides have the following formula:

In the foregoing formula $X_2$ and $X_1$ are the following substituents or mixtures of substituents: H, —F, —Cl, —Br, OH, -ether, -ester aromatic hydrocarbons such as phenyl or naphthyl and a monovalent aliphatic hydrocarbon radical having from 1 to 5 carbon atoms. Representative aliphatic hydrocarbon radicals include methyl, ethyl, propyl, isopropyl, butyl, and pentyl.

Any azo-containing dianhydride which is of the above formula is useful in the preparation of polyamide-azo and polyimide-azo copolymers. The preferred azo dianhydrides are 4-azophthalic anhydride and 3-azophthalic anhydride ($X_1$ and $X_2$ are H in the structural formulas above).

The primary diamines which are reacted with the foregoing dianhydrides are aromatic diamines having two primary amino groups. Among others the aromatic diamines may have structural formulas of $H_2N-R'-NH_2$, $H_2N-R'-O-R'-NH_2$, $H_2N-R'-CH_2-R'-NH_2$,
$H_2N-R'-\overset{O}{\underset{\|}{C}}-R'-NH_2$, $H_2N-R'-S-R'-NH_2$, and $H_2N-R'-S-R'-NH_2$ wherein R' is a divalent hydrocarbon radical hereinbefore indicated. The diamines may be aromatic diamines having from 1 to about 4 aromatic rings and advantageously from about 1 to 2 aromatic rings. The aromatic diamines having more than one aromatic ring may be further characterized as polycyclic aromatic compounds having two primary amino groups on an interconnected polycyclic aromatic nucleus. The aromatic rings may be interconnected by condensation, as in naphthalene or in phenanthrene-type structure, or may be bridged, either directly as in biphenyl diamines, or indirectly as, for example two R' groups are joined with reaction stable inert linkages such as oxy, methylene, ethylene, propylene, etc. radicals, carbonyl, sulfonyl and other relatively inactive groups such as sulfide groups. Suitable nuclei (R' divalent aromatic hydrocarbon radical) include phenylene, naphthalene, anthranylene, naphthacenylene and the like; diphenylene, terphenylene, phenylnaphthalene, quaterphenylene and the like; aromatic rings separated by oxy, alkylene, carbonyl, sulfonyl and thio groups. The aliphatic primary diamines may contain advantageously two to six methylene groups bridging the two nitrogen atoms.

Advantageously, the linkages between the aromatic groups are oxy, or methylene, and the amino groups are in the meta or para position on the aromatic rings. Preferable diamines are p,p'-methylenebis(aniline), p,p'-oxybis(aniline) and m-phenylenediamine.

The other comonomer (B units monomer) has a structural formula from among the following:

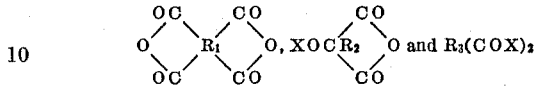

wherein $R_1$, $R_2$ and $R_3$ are aromatic nuclei with 1-4, preferably 1-2 benzene rings, and X is a halogen atom preferably chlorine. The acyl group in $R_2$ and the acyl groups in $R_3$ may be in any position or positions on the aromatic nucleus. Advantageously, $R_1$, $R_2$ and $R_3$ are a tetravalent, trivalent and divalent benzene ring respectively, and most advantageously the comonomer is pyromellitic acid.

The dianhydrides are prepared from substituted or unsubstituted nitrophthalic acids. The nitrophthalic acids are dissolved at room temperature or higher in a 10% sodium hydroxide solution and gradually to the stirred mixture zinc dust is introduced keeping a ratio of about 0.33 to 0.66 mole nitrophthalic acid to 1 mole zinc dust. When all the zinc has been introduced, the temperature of the reaction is raised to about 100 to 115° C. The reaction mixture is allowed to reflux at this elevated temperature for a period of 2 to 30 hours. The white precipitate of sodium zincate is then removed filtration. Acidification of the mother liquor precipitates the azophthalic acid. The azophthalic acid is heated to a temperature of about 240 to 260° C. The azophthalic anhydride is formed in quantitative yields.

The following new azophthalic anhydrides have been prepared:

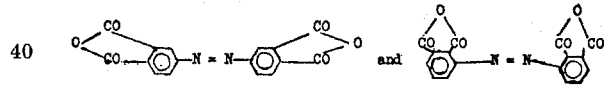

Further details on these new azo compounds may be found in copending application, Ser No. 12,486.

These anhydrides when polymerized with comonomers and an aromatic diamine are useful as electrical insulators when applied to wires which are later wound onto coils and incorporated into geneartors, motors and the like.

The azophthalic anhydrides and aromatic-polycarboxylic-acid anhydride comonomer mixtures can be reacted with the diamines directly. The reactants are usually present in the proportions of one mole of carboxyl containing substance to one mole of diamine but these ratios can vary as much as about 10 percent and still produce usable copolymers. The mount of B units can run from about one percent of the amount of A units to about 99 percent. Preferably, the B units will be 30 to 180 mole percent of the A units. For this purpose, preferentially, the diamine is dissolved in a polar organic solvent such as dimethyl acetamide, N-methylpyrrolidone, etc., and powdered azophthalic anhydride and aromatic-polycarboxylic-acid anhydride simultaneously are added to the stirred, cooled solution. Anhydrous conditions and a nitrogen atmosphere are preferred. It is advisable to keep the reaction temperature below 40° C. The solvent-solute ratios are selected according to the solubility of the particular polymer and requirements of the final application. Polymer solutions up to about 40% solid content can be prepared. Usually, after a few hours stirring, homogeneous, viscous polymer solutions are obtained. The viscosity of the polymer solution is dependent on the solid content and the molecular weight of the polymer. For applications in metal coating, film forming, impregnating and the like, solutions of about 12–35 weight percent are desired. Such solution concentrations are a good balance between solid content and solution viscosity and result in ease of handling for most practical applications. The viscosities of such solutions are in the range of 5–500 stokes.

If the reactive difunctional-acid-derivative contains an acid chloride group then hydrochloric acid is a by-product. In such cases, the polymer solution cannot be applied directly, because the hydrogen chloride, tightly bound by hydrogen bonds, cannot be removed completely during solvent removal and its presence may have a deleterious effect on certain properties of the polymer. In such instances it may be advantageous to precipitate the polymer in finely divided solid form by pouring the solution in a thin stream into water stirred by a high speed mixer, followed by thorough washing and low-temperature vacuum-drying. The polymer powder obtained this way can be used directly for compression molding or it may be redissolved in organic solvents or concentrated sulfuric acid for solution applications.

Solutions of these copolymers can be shaped into useful articles, e.g. film can be cast; metals and alloys such as copper, stainless steel, or aluminum can be coated either in sheets or in wire form. After the desired shape has been obtained, the solvents are removed and the copolymer compositions are heat-modified by converting substantially all of the amine groups ortho to the free carboxyl groups into cyclic imides. This process can be a one-stage process, for example, when the polymer is heated to higher temperatures to 800° F. for a short period of time, up to 15 minutes, or a multistage process, when the solvent removal is at a lower temperature followed by a high temperature treatment.

The heat-modified copolymers described in this invention belong to the group of thermally-stable high-temperature-polymers if the $R_1$, $R_2$ or $R_3$ groups of unit B and the R groups of both units A and B are selected from aromatic or certain heterocyclic radicals. They do not melt, and the rate of their decomposition below 570° F. is slow. The copolymers are always colored due to the presence of the azobenzene moiety.

The following examples illustrate some embodiments of this invention. It will be understood that these are for illustrative purposes only and do not purport to be wholly definitive with respect to conditions or scope.

EXAMPLE I 4-azophthalic anhydride (379.3 grams) and 3-azophthalic anhydride (252.0 grams) were simultaneously added with external cooling and mechanical stirring to a slurry of p,p'-oxybis(aniline) (392.0 grams) in 4100 grams dimethylacetamide. A viscous solution was obtained containing 20% by weight solids. After two days of agitation the Gardner viscosity was 20 stokes.

EXAMPLE II

From the copolymer solution of Example I a film was cast on a glass plate with a 0.006 inch doctor knife. The plate was dried in a 300° F. oven for 30 minutes from the solvents and baked in a 600° F. oven for 30 minutes. After being cooled the film was stripped from the glass plate. The composition of the red-brown film was characterized by its IR spectrum and by elemental analyses. Calc. for $(C_{28}H_{14}N_4O_5)_n$ (percent): C, 69.1; H, 2.9; N, 11.5. Found (percent): C, 68.1; H, 3.2; N, 11.4.

The mechanical properties were determined on a film which was cured at 300° F. for 30 minutes and at 600° F. for 3 minutes. Using an Instron Electronic Tensile Tester, the following results were obtained: tensile strength 11,000 p.s.i.; elongation at breaking 5.2%.

EXAMPLE III 4-azophthalic anhydride (9.66 grams) and pyromellitic dianhydride (2.18 grams) were simultaneously added with mechanical stirring and external cooling to a solution of p,p'-oxybis(aniline) (8.00 grams) in 99.5 grams N-methylpyrrolidone. A very viscous solution was obtained containing 17.7% by weight of solids. After three days of agitation the solution had a Garner viscosity of 560 stokes.

EXAMPLE IV

From the copolymer solution of Example III a film was cast on a glass plate with a 0.006 inch doctor knife. The plate was dried from the solvents at 300° F. for 30 minutes and then baked at 600° F. for 10 minutes. The red-brown film was stripped from the plate. Its composition obtained by the copolymerization of 75 mole percent azophthalic anhydride and 25 mole percent pyromellitic dianhydride with p,p'-oxybis(aniline) was characterized by its IR spectrum. The film displayed these mechanical properties: tensile strength, 11,400 p.s.i.; elongation at breaking 7.5%.

EXAMPLE V 4-azophthalic anhydride (3.22 grams) and pyromellitic dianhydride (6.54 grams) were simultaneously added with mechanical stirring and external cooling to a solution of p,p'-oxybis(aniline) (8.00 grams) in 88.0 grams N-methylpyrrolidone. A viscous solution was obtained containing 16.8 percent solids. After three days of agitation the solution had a Gardner viscosity of 140 stokes.

EXAMPLE VI

From the copolymer solution of Example V a film was cast on a glass plate with a 0.006 inch doctor knife. The plate was dried from the solvents at 300° F. for 30 minutes and then baked at 600° F. for 10 minutes. The yellow-brown film was stripped from the plate. Its composition, obtained by the copolymerization of 25 mole percent azophthalic anhydride and 75 mole percent pyromellitic dianhydride with p,p'-oxybis(aniline) was characterized by its IR spectrum and elemental analyses. Calc. for $(C_{94}H_{44}N_{10}O_{20})_n$ (percent): C, 69.1; H, 2.7; N, 8.6. Found (percent): C, 67.3; H, 2.9; N, 8.3. The film displayed these mechanical properties: tensile strength, 12,400 p.s.i.; elongation at breaking, 9.3%.

EXAMPLE VII

Powdered 4-azophthalic anhydride (3.22 grams) and trimellitic anhydride acid chloride (6.31 grams) were simultaneously added with mechanical stirring and external cooling to a solution of p,p'-oxybis(aniline) (8.00 grams) in 49.2 grams N-methylpyrrolidone. A viscous solution was obtained containing 25% solids by weight. After three days of agitation it was poured in a thin stream into water which was stirred by a high speed mixer. The fine precipitate was filtered and washed with water three times in a high speed mixer. It was dried in a 110° C. vacuum oven overnight (14.8 grams). The yellow-brown solid did not melt up to 380° C.; sintering around 260° C. was probably due to imidization. The polymer is soluble in polar organic solvents.

EXAMPLE VIII

The solid copolymer of Example VII (9.0 grams) was dissolved in dimethylacetamide (27.0 grams) with stirring. After three days agitation the solution had a Gardner viscosity of 34 stokes. A film was cast from the solution on a glass plate with a 0.006 inch doctor knife. The plate was dried from the solvents at 300° F. for 30 minutes and then baked at 600° F. for 10 minutes. The yellow-brown film was stripped from the plate. Its composition, obtained by the copolycondensation of 25 mole percent 4-azophthalic anhydride and 75 mole percent trimellitic anhydride acid chloride with p,p'-oxybis(aniline), was characterized by its IR spectrum and elemental analyses. Calc. for $(C_{91}H_{50}N_{10}O_{17})_n$ (percent): C, 70.3; H, 3.2; N, 9.0. Found (percent): C, 68.4; H, 3.6; N, 8.8. The film displayed these mechanical properties: tensile strength, 13,000 p.s.i.; elongation at breaking, 7.5%.

EXAMPLE IX

Powdered 4-azophthalic anhydride (4.83 grams) and trimellitic anhydride acid chloride (1.05 grams) were simultaneously added with mechanical stirring and external cooling to a solution of p,p'-oxybis(aniline) (4.00 grams) in 38.5 grams N-methylpyrrolidone. A viscous solution was obtained containing 20 percent solids by weight. After three days of agitation it was poured in a thin stream into water which was stirred by a high speed mixer. The fine, fibrous precipitate was filtered and washed three times with water in a high speed mixer. It was dried in a 110° C. vacuum oven overnight (7.0 grams). The orange-colored solid did not melt up to 380° C. Its infrared spectrum indicated that the conditions of drying brought about imidization to a considerable extent. The solubility of the polymer in organic solvent was low to moderate.

EXAMPLE X

Powdered 4-azophthalic anhydride (3.22 grams), 3-azophthalic anhydride (3.22 grams) and trimellitic anhydride acid chloride (4.21 grams) were simultaneously added with mechanical stirring and external cooling to a solution of p,p'-oxybis(aniline) (8.00 grams) in 70.0 grams N-methylpyrrolidone. The viscous solution, after three days of agitation, was poured in a thin stream into water stirred by a high speed mixer. The yellow-brown precipitate was filtered and washed three times with water in a high speed mixer. It was dried in a 105° C. vacuum oven overnight (17.5 grams). The yellow-brown solid did not melt up to 380° C.

EXAMPLE XI

The solid copolymer of Example X (15.0 grams) was dissolved in 35.0 grams dimethylacetamide with stirring. After two days of agitation and ten days standing, the solution had a Gardner viscosity of 55 stokes. A film was cast from the solution on a glass plate. Drying from the solvents at 300° F. for 30 minutes and heat treatment at 600° F. for 10 minutes gave a red-brown copolymeric film the composition of which was characterized by its infrared spectrum. The film had tensile strength of 10,300 p.s.i.; elongation at breaking was 5.2%.

EXAMPLE XII

Powdered 4-azophthalic anhydride (3.22 grams), 3-azophthalic anhydride (1.61 grams), trimellitic anhydride acid chloride (4.21 grams), and pyromellitic dianhydride (1.09 grams) were added to a solution of p,p'-oxybis(aniline) (8.00 grams) in N-methylpyrrolidone. The process of Example X was followed. The product obtained (16.1 grams) was a light yellow-brown solid which did not melt up to 380° C.

EXAMPLE XIII

The copolymer of Example XII (13.0 grams) was dissolved in dimethylacetamide (39.0 grams) with stirring. After two days the solution had a Gardner viscosity of 17.6 stokes. Film was prepared from the solution which displayed these mechanical properties: tensile strength, 11,400 p.s.i.; elongation at breaking, 6.5%.

EXAMPLES XIV–XIX

The copolymer solutions of Examples I, III, V, VIII, XI, and XIII were used for coating stainless steel and copper plates. The surface of stainless steel was cleaned by acetone. Copper plates were prepared for coating by being etched in 2 N hydrochloric acid for two minutes, followed by water and acetone washing. The above described copolymer solutions were applied on the dried plates with a doctor knife, then the plates were heated in a 300° F. oven for 30 minutes, and in a 600° F. oven for 3–10 minutes. All the copolymer solutions gave good coatings on both copper and stainless steel, with tight adhesion and good impact strength. Other aromatic and aliphatic diamines will give substantially the same copolymeric systems.

We claim:

1. As a composition of matter a film and fiber forming polymeric compound which consists essentially of reoccurring A units:

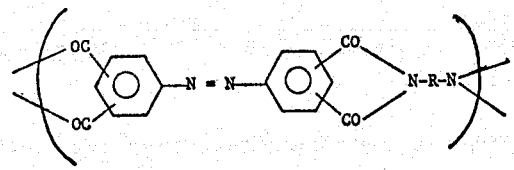

wherein the —CO— groups occupy either 2,3 or 3,4 positions on each of the benzene rings and reoccurring B units:

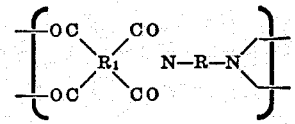

wherein $R_1$ is a tetravalent organic radical selected from the group consisting of phenylene, naphthacenylene and anthracenylene and fluorine, chlorine, lower alkyl and lower alkyl ether substituted derivatives thereof, and R is a divalent aromatic-hydrocarbon-radical selected from the group consisting of a divalent aromatic-hydrocarbon-radical containing 1–4 benzene rings and a divalent aromatic-hydrocarbon-radical containing two divalent aromatic-subradicals, each subradical containing 1–4 benzene rings, the subradicals being joined directly or by a stable linkage selected from the group consisting of oxy, carbonyl, sulfonyl, sulfur, methylene, ethylene, n-propylene and n-butylene linkages and wherein the proportions of said A and B units run from about 1 mole percent A units to about 99 mole percent A units.

2. The polymeric compound of claim 1 in which the —CO— groups in the A unit are in the 2,3 positions on each benzene ring, $R_1$ in the B unit is a tetravalent benzene radical and R is selected from the group consisting of

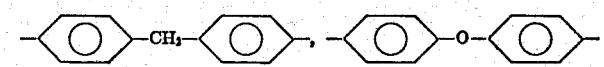

and

3. The polymeric compound of claim 1 in which the —CO— groups in the A unit are in the 3,4 positions on each benzene rings, $R_1$ in the B unit is a tetravalent benzene radical and R is selected from the group consisting of

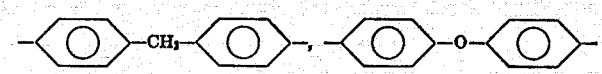

and

4. As a composition of matter a film and fiber forming polymeric compound which consists essentially of reoccurring A units of:

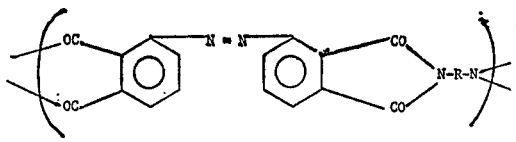

and reoccurring A' units of:

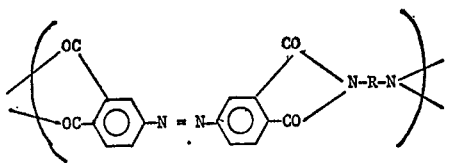

wherein R is a divalent aromatic-hydrocarbon-radical selected from the group consisting of a divalent aromatic-hydrocarbon-radical containing 1–4 benzene rings and a divalent aromatic-hydrocarbon-radical containing two divalent aromatic-subradicals, each subradical containing 1–4 benzene rings, the subradicals being joined directly or by a stable linkage selected from the group consisting of oxy, carbonyl, sulfonyl, sulfur, methylene, ethylene, n-propylene and n-butylene linkages and wherein the proportions of said A and A' units run from about 1 mole percent A units to about 99 mole percent A units.

5. The polymeric compound of claim 4 wherein R is selected from the group consisting of

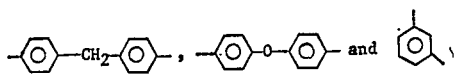

6. As a composition of matter a film and fiber forming polymeric compound which consists essentially of reoccurring A units:

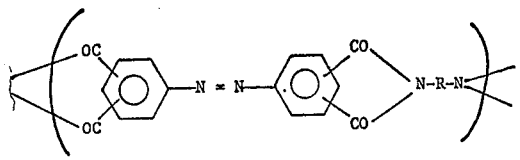

wherein the —CO— groups occupy either 2,3 or 3,4 positions on each of the benzene rings and reoccurring B units:

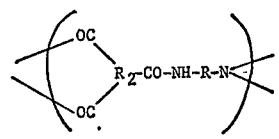

wherein $R_2$ is a trivalent organic radical selected from the group consisting of phenylene, naphthacenylene and anthracenylene and fluorine, chlorine, lower alkyl and lower-alkyl-ether substituted derivatives thereof, and R is a divalent aromatic-hydrocarbon-radical selected from the group consisting of a divalent aromatic-hydrocarbon-radical containing two divalent aromatic-subradicals, each subradical containing 1–4 benzene rings, the subradicals being joined directly or by a stable linkage selected from the group consisting of oxy, carbonyl, sulfonyl, sulfur, methylene, ethylene, n-propylene and n-butylene linkages and wherein the proportions of said A and B units run from about 1 mole percent A units to about 99 mole percent A units.

7. The polymeric compound of claim 6 in which the —CO— groups in the A unit are in the 2,3 positions on each benzene ring, $R_2$ in the B unit is a trivalent benzene radical and R is selected from the group consisting of

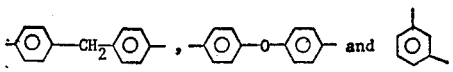

8. The polymeric compound of claim 6 in which the —CO— groups in the A unit are in the 3,4 positions on each benzene ring, $R_2$ in the B unit is a trivalent benzene radical and R is selected from the group consisting of

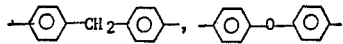

and

9. As a composition of matter a film and fiber forming polymeric compound which consists essentially of reoccurring A units:

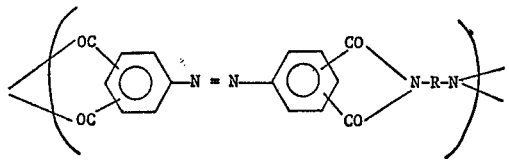

wherein the —$CO_2H$ or —CO— groups occupy either 2,3 or 3,4 positions on each of the benzene rings and reoccurring B units:

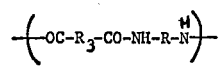

wherein $R_3$ is a divalent organic radical selected from the group consisting of phenylene, naphthacenylene and anthracenylene and fluorine, chlorine, lower alkyl and lower-alkyl-ether substituted derivatives thereof, and R is a divalent aromatic-hydrocarbon-radical selected from the group consisting of a divalent aromatic-hydrocarbon-radical containing two divalent aromatic-subradicals, each subradical containing 1–4 benzene rings, the subradicals being joined directly or by a stable linkage selected from the group consisting of oxy, carbonyl, sulfonyl, sulfur, methylene, ethylene, n-propylene and n-butylene linkages and wherein the proportions of said A and B units run from about 1 mole percent A units to about 99 mole percent A units.

10. The polymeric compound of claim 9 in which the —CO— or —$CO_2H$ groups in the A unit are in the 2,3 positions on each benzene ring, $R_3$ in the B unit is a divalent benzene radical and R is selected from the group consisting of

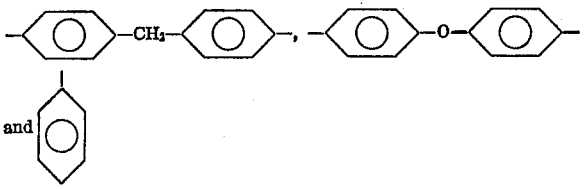

11. The polymeric compound of claim 9 in which the —CO— or —CO$_2$H groups in the A unit are in the 3,4 positions on each benzene ring, R$_3$ in the B unit is a divalent benzene radical and R is selected from the group consisting of

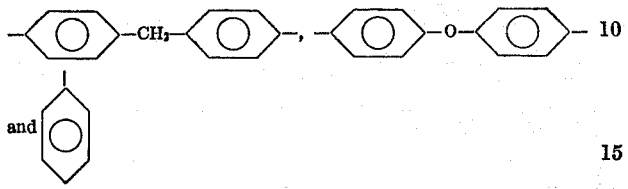

References Cited

UNITED STATES PATENTS

| | | | |
|---|---|---|---|
| 3,455,879 | 7/1969 | Gay et al. | 260—47 |
| 3,476,705 | 11/1969 | Hansen | 260—47 |
| 3,485,796 | 12/1969 | Nasclow | 260—47 |
| 3,554,744 | 1/1971 | Maas | 96—1.5 |

FOREIGN PATENTS

| | | | |
|---|---|---|---|
| 1,075,284 | 7/1967 | Great Britain | 260—47 |
| 672,985 | 3/1966 | Belgium | 260—47 CP |

LESTER L. LEE, Primary Examiner

U.S. Cl. X.R.

117—124 E, 128.4, 132 B; 260—65, 78 TF

UNITED STATES PATENT OFFICE
CERTIFICATE OF CORRECTION

Patent No. 3,773,725        Dated  November 20, 1973

Inventor(s)  Imre Puskas and Ellis K. Fields

It is certified that error appears in the above-identified patent and that said Letters Patent are hereby corrected as shown below:

Column 1, line 50, "dianhydride" should read -- dianhydrides --; line 51, "o" should read -- or --; line 64, cancel "by:". Column 3, line 63, "structure" should read -- structures --. Column 4, line 30, after "removed" insert -- by --; line 47, "geneartors" should read -- generators --. Column 5, line 24, "amine" should read -- amide --. Column 6, line 3, "Garner" should read -- Gardner --. Column 8, line 63, "rings" should read -- ring --. Column 11, last benzene ring: line missing at No. 3 carbon position on the ring.

Signed and sealed this 17th day of September 1974.

(SEAL)
Attest:

McCOY M. GIBSON JR.
Attesting Officer

C. MARSHALL DANN
Commissioner of Patents